United States Patent
Zhou et al.

(10) Patent No.: US 11,916,599 B2
(45) Date of Patent: Feb. 27, 2024

(54) WAVELENGTH TUNING METHOD AND RELATED DEVICE

(71) Applicant: Huawei Technologies Co., Ltd., Shenzhen (CN)

(72) Inventors: Enbo Zhou, Dongguan (CN); Fang Jiang, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/683,531

(22) Filed: Mar. 1, 2022

(65) Prior Publication Data

US 2022/0190928 A1 Jun. 16, 2022

Related U.S. Application Data

(63) Continuation of application No. PCT/CN2020/111855, filed on Aug. 27, 2020.

(30) Foreign Application Priority Data

Sep. 3, 2019 (CN) .................... 201910829675.X
Aug. 24, 2020 (CN) .................... 202010857528.6

(51) Int. Cl.
*H04J 14/02* (2006.01)
*H04B 10/572* (2013.01)
(Continued)

(52) U.S. Cl.
CPC ......... *H04B 10/572* (2013.01); *H04B 10/294* (2013.01); *H04B 10/506* (2013.01);
(Continued)

(58) Field of Classification Search
CPC .. H04B 10/572; H04B 10/294; H04B 10/506; H04B 10/0799; H04B 10/077;
(Continued)

(56) References Cited

U.S. PATENT DOCUMENTS 8,190,033 B2   5/2012   Tu
8,929,748 B2   1/2015   Hu et al.
(Continued)

FOREIGN PATENT DOCUMENTS

CN   101247199 A   8/2008
CN   109155684 A   1/2019
(Continued)

OTHER PUBLICATIONS

Honda, K. et al., "Wavelength Adjustment of Upstream Signal using AMCC with Power Monitoring for WDM-PON in 5G Mobile Era," 2018 Optical Society of America, 2018 Optical Fiber Communications Conference and Exposition (OFC), XP33357572, Mar. 11, 2018, 3 pages.
(Continued)

*Primary Examiner* — Dibson J Sanchez
(74) *Attorney, Agent, or Firm* — SLATER MATSIL, LLP

(57) ABSTRACT

A wavelength tuning method and a related device, the method including receiving, by a remote optical module, a wavelength control signal from a central office terminal, where the wavelength control signal indicates a target wavelength tuned by the remote optical module, and where the wavelength control signal is loaded into a first optical service signal in a pilot tone manner, and tuning, by the remote optical module, an operating wavelength of the remote optical module based on the wavelength control signal.

12 Claims, 8 Drawing Sheets

(51) Int. Cl.
   *H04B 10/294* (2013.01)
   *H04B 10/50* (2013.01)
   *H04B 10/077* (2013.01)

(52) U.S. Cl.
   CPC ............. *H04B 10/077* (2013.01); *H04J 14/02* (2013.01); *H04J 14/0276* (2013.01)

(58) Field of Classification Search
   CPC .... H04J 14/0254; H04J 14/0282; H04J 14/02; H04J 14/0276
   USPC .................................................. 398/43–103
   See application file for complete search history.

(56) References Cited

U.S. PATENT DOCUMENTS

| | | | |
|---|---|---|---|
| 9,455,782 | B2 | 9/2016 | Zheng et al. |
| 10,637,603 | B2 | 4/2020 | Lin et al. |
| 2002/0048063 | A1 | 4/2002 | Jung et al. |
| 2003/0025957 | A1 | 2/2003 | Jayakumar |
| 2007/0154216 | A1* | 7/2007 | Kim ............... H04J 14/025 398/71 |
| 2010/0111533 | A1* | 5/2010 | Beckett ............ H04J 14/0282 398/68 |
| 2011/0158651 | A1* | 6/2011 | Tang ................ H04B 10/506 398/98 |
| 2012/0128373 | A1* | 5/2012 | Smith .............. H04J 14/0282 398/158 |
| 2012/0251122 | A1* | 10/2012 | Grobe .............. H04J 14/0282 398/79 |
| 2013/0251364 | A1* | 9/2013 | Pachnicke ......... H04J 14/0276 398/79 |
| 2013/0336655 | A1* | 12/2013 | Grobe ............... H04J 14/025 398/67 |
| 2014/0341593 | A1* | 11/2014 | Van Veen .......... H04B 10/272 398/201 |
| 2014/0369689 | A1* | 12/2014 | Gadkari ............ H04B 10/272 398/67 |
| 2015/0063812 | A1* | 3/2015 | Dove ................ H04B 10/40 398/67 |
| 2015/0139651 | A1* | 5/2015 | Xuejin ............. H04J 14/08 398/75 |
| 2016/0087749 | A1* | 3/2016 | Lawin .............. H04J 14/0246 398/49 |
| 2016/0112141 | A1* | 4/2016 | Rahn ............... H04J 14/0256 398/79 |
| 2016/0248520 | A1* | 8/2016 | Sarashina ......... H04B 10/572 |
| 2016/0301496 | A1* | 10/2016 | Eiselt .............. H04B 10/0775 |
| 2017/0026111 | A1* | 1/2017 | Yoo ................. H04B 10/272 |
| 2017/0126322 | A1 | 5/2017 | Kato |
| 2017/0264371 | A1* | 9/2017 | Fukui .............. H04B 10/506 |
| 2018/0212703 | A1* | 7/2018 | Yuk ................ H04B 10/25754 |
| 2019/0165865 | A1* | 5/2019 | Nakagawa ......... H04J 14/0276 |
| 2021/0083778 | A1* | 3/2021 | Honda .............. H04B 10/572 |
| 2022/0216921 | A1 | 7/2022 | Zhou et al. |

FOREIGN PATENT DOCUMENTS

| | | |
|---|---|---|
| CN | 109792131 A | 5/2019 |
| CN | 109889273 A | 6/2019 |
| CN | 109981180 A | 7/2019 |

OTHER PUBLICATIONS

Nakagawa, G. et al., "Development of Evaluation Platform of AMCC Superimposition on CPRI Signal Transmission for Mobile Fronthaul Network," 2017 European Conference on Optical Communication (ECOC), IEEE, XP033336509, Sep. 17, 2017, 3 pages.

Zhu, J. et al., "First Demonstration of a WDM-PON System Using Full C-Band Tunable SFP + Tranceiver Modules [Invited]," XP011571345, Journal of Optical Communications and Network, vol. 7, No. 1, Jan. 2015, 9 pages.

\* cited by examiner

WAVELENGTH TUNING METHOD AND RELATED DEVICE

CROSS-REFERENCE TO RELATED APPLICATIONS

This application is a continuation of International Application No. PCT/CN2020/111855, filed on Aug. 27, 2020, which claims priority to Chinese Patent Application No. 201910829675.X, filed on Sep. 3, 2019 and Chinese Patent Application No. 202010857528.6, filed on Aug. 24, 2020. All of the aforementioned applications are hereby incorporated by reference in their entireties.

TECHNICAL FIELD

This application relates to an optical communications technology, and in particular, to a wavelength tuning method and a related device.

BACKGROUND

For a structure of an optical communications system provided in a conventional technology, refer to FIG. 1. As shown in FIG. 1, it can be learned that the optical communications system includes a plurality of optical modules 101 at a transmit end and a plurality of optical modules 102 at a receive end. In addition, the plurality of optical modules 101 at the transmit end may be in a one-to-one correspondence with the plurality of optical modules 102 at the receive end. The optical module 101 is configured to convert an electrical signal into an optical signal, and transmit the optical signal to the optical module 102 by using an optical fiber. The optical module 102 then converts the optical signal into an electrical signal.

In the conventional technology, a laser of the optical module 102 may be used to limit a wavelength of the laser within a fixed wavelength channel by using an etalon wavelength locker, so that different optical modules 102 at the receive end use different wavelengths to perform multiplexing in a manner of wavelength division multiplexing (WDM).

When the etalon wavelength locker in the conventional technology is adopted, the laser can only be locked to a single and fixed wavelength, and locking precision is high. In addition, detection and control of the etalon wavelength locker are complex, requiring high power consumption and extra costs.

SUMMARY

This application provides a wavelength tuning method, a related device, and an optical communications system, which can monitor an operating wavelength of each remote optical module, avoid wavelength drift in the remote optical module, and improve monitoring efficiency and accuracy.

A first aspect of embodiments of the present invention provides a wavelength tuning method, where the method includes: A remote optical module receives a wavelength control signal, where the wavelength control signal is used to indicate a target wavelength tuned by the remote optical module, and the wavelength control signal is loaded into a first optical service signal in a pilot tone manner, and the remote optical module tunes an operating wavelength of the remote optical module based on the wavelength control signal.

By using the method shown in this embodiment, an operating wavelength of each remote optical module included in a remote device can be monitored by using the remote device. A monitoring process does not rely on a network management system, so that monitoring efficiency and accuracy are improved. In addition, a low-cost, high-reliability, maintainable, and protected wavelength division transmission system can be implemented. In addition, data exchange may be directly performed between a central office terminal and the remote optical module, without relying on the network management system (or another independent control channel) to transmit data. Therefore, data transmission efficiency is improved.

In a possible implementation, that the remote optical module tunes the wavelength based on the wavelength control signal includes: The remote optical module determines a target temperature based on the wavelength control signal, where the target temperature corresponds to the tuned target wavelength, and the remote optical module tunes the operating wavelength of the remote optical module to the tuned target wavelength based on the target temperature adjustment.

Based on the first aspect of the embodiments of the present invention, in an optional implementation of the first aspect of the embodiments of the present invention, the wavelength control signal is used to indicate a wavelength shift, and the wavelength shift is a shifted wavelength of the operating wavelength of the remote optical module relative to a target wavelength range.

Based on the first aspect of the embodiments of the present invention, in an optional implementation of the first aspect of the embodiments of the present invention, the wavelength control signal is used to indicate a target wavelength range.

In an optional implementation, the wavelength control signal is used to indicate the target temperature.

Based on the first aspect of the embodiments of the present invention, in an optional implementation of the first aspect of the embodiments of the present invention, the method further includes: The remote optical module determines the tuned target wavelength based on the wavelength control signal, and that the remote optical module determines a target temperature based on the wavelength control signal includes: The remote optical module obtains a temperature control list, where the temperature control list includes a correspondence between different temperatures and different wavelengths, and the remote optical module determines the target temperature corresponding to the tuned target wavelength based on the temperature control list.

Based on the first aspect of the embodiments of the present invention, in an optional implementation of the first aspect of the embodiments of the present invention, before the remote optical module receives the wavelength control signal, the method further includes: The remote optical module sends a detection signal to the central office terminal, where the detection signal is loaded into a second optical service signal in the pilot tone manner.

The central office terminal shown in this embodiment may receive, by using a photodetector (PD), all pilot tone signals (detection signals) sent by the remote optical module in the remote device, and a remote optical module in which wavelength drift occurs may be detected based on a pilot tone signal. It can be learned that, in this embodiment, in the process of detecting a remote optical module in which wavelength drift occurs, overheads for the pilot tone can be reduced, and fault information of the remote optical module is monitored and reported without relying on the network management system and the remote device. Because the central office terminal shown in this embodiment can receive the pilot tone signals of all remote optical modules of the remote device by using the PD, costs are reduced.

Based on the first aspect of the embodiments of the present invention, in an optional implementation of the first aspect of the embodiments of the present invention, that the remote optical module determines a target temperature based on the wavelength control signal includes: determining a reference wavelength $\lambda_i$, where the reference wavelength $\lambda_i$ is a wavelength that is in wavelengths included in the temperature control list and that has a smallest difference from the tuned target wavelength $\lambda$, determining an adjacent wavelength $\lambda_{i+1}$ included in the temperature control list, where the adjacent wavelength is a wavelength included in the temperature control list and adjacent to the reference wavelength $\lambda_i$, and determining the target temperature T based on a maximum cut-off wavelength $\lambda_{i\_max}$ and a minimum cut-off wavelength $\lambda_{i\_min}$ in the target wavelength range, and the adjacent wavelength $\lambda_{i+1}$.

Specifically, the remote optical module may calculate the target temperature T according to the following formula:

$T=T_i+(T_{i+1}-T_i)*(\lambda_{i\_center}-\lambda)/(\lambda_{i+1}-\lambda_i)$, where $\lambda_{i\_center}=\frac{1}{2}*(\lambda_{i\_max}+\lambda_{i\_min})$, and $T_{i+1}$ is a temperature that is in the temperature control list and that corresponds to the adjacent wavelength $\lambda_{i+1}$.

It can be learned that precise tuning of a wavelength of the remote optical module is implemented according to this aspect.

A second aspect of the embodiments of the present invention provides a wavelength tuning method, where the method includes: when an operating wavelength of a remote optical module is beyond a target wavelength range, sending a wavelength control signal to the remote optical module, where the wavelength control signal is used to indicate a target wavelength tuned by the remote optical module, and the wavelength control signal is loaded into a first optical service signal in a pilot tone manner.

For beneficial effects of the method according to this aspect, refer to the foregoing first aspect. Details are not described again.

Based on the second aspect of the embodiments of the present invention, in an optional implementation of the second aspect of the embodiments of the present invention, the wavelength control signal is used to indicate a wavelength shift, and the wavelength shift is a shifted wavelength of the operating wavelength of the remote optical module relative to the target wavelength range.

Based on the second aspect of the embodiments of the present invention, in an optional implementation of the second aspect of the embodiments of the present invention, the wavelength control signal is used to indicate the target wavelength range.

Based on the second aspect of the embodiments of the present invention, in an optional implementation of the second aspect of the embodiments of the present invention, the method further includes: receiving a detection signal sent by the remote optical module, where the detection signal is loaded into a second optical service signal in the pilot tone manner, and determining, based on a pilot tone signal, whether the operating wavelength of the remote optical module is within the target wavelength range.

Based on the second aspect of the embodiments of the present invention, in an optional implementation of the second aspect of the embodiments of the present invention, the determining, based on the detection signal, whether the operating wavelength of the remote optical module is within the target wavelength range includes: if an intensity of a carrier frequency of the detection signal is greater than or equal to a preset value, determining that the operating wavelength of the remote optical module is within the target wavelength range.

A third aspect of the embodiments of the present invention provides an optical module, where the optical module is arranged in a remote device and includes: a receiving unit, configured to receive a wavelength control signal, where the wavelength control signal is used to indicate a target wavelength tuned by the optical module, and the wavelength control signal is loaded into a first optical service signal in a pilot tone manner, and a control unit, configured to tune an operating wavelength of the optical module based on the wavelength control signal.

For a specific process of performing the wavelength tuning method by the optical module according to this aspect and description of beneficial effects, refer to the foregoing first aspect. Details are not described again.

In a possible implementation, the control unit is configured to determine a target temperature based on the wavelength control signal, where the target temperature corresponds to the tuned target wavelength, and tune the wavelength to the tuned target wavelength based on the target temperature adjustment.

Based on the third aspect of the embodiments of the present invention, in an optional implementation of the third aspect of the embodiments of the present invention, the wavelength control signal is used to indicate a wavelength shift, and the wavelength shift is a shifted wavelength of the operating wavelength of the optical module relative to a target wavelength range.

Based on the third aspect of the embodiments of the present invention, in an optional implementation of the third aspect of the embodiments of the present invention, the wavelength control signal is used to indicate a target wavelength range.

In an optional implementation, the wavelength control signal is used to indicate the target temperature.

Based on the third aspect of the embodiments of the present invention, in an optional implementation of the third aspect of the embodiments of the present invention, the control unit is further configured to: determine the tuned target wavelength based on the wavelength control signal, obtain a temperature control list, where the temperature control list includes a correspondence between different temperatures and different wavelengths, and determine the target temperature corresponding to the tuned target wavelength based on the temperature control list.

Based on the third aspect of the embodiments of the present invention, in an optional implementation of the third aspect of the embodiments of the present invention, the optical module further includes a laser, configured to send a detection signal to a central office terminal, where the detection signal is loaded into a second optical service signal in the pilot tone manner.

Based on the third aspect of the embodiments of the present invention, in an optional implementation of the third aspect of the embodiments of the present invention, the control unit is further configured to: determine a reference wavelength $\lambda_i$, where the reference wavelength $\lambda_i$ is a wavelength that is in wavelengths included in the temperature control list and that has a smallest difference from the tuned target wavelength $\lambda$, determine an adjacent wavelength $\lambda_{i+1}$ included in the temperature control list, where the adjacent wavelength is a wavelength included in the temperature control list and adjacent to the reference wavelength $\lambda_i$, and determine the target temperature T based on a maximum cut-off wavelength $\lambda_{i\_max}$ and a minimum cut-off wavelength $\lambda_{i\_min}$ in the target wavelength range, and the adjacent wavelength $\lambda_{i+1}$.

A fourth aspect of the embodiments of the present invention provides a central office terminal, including: a wavelength detection unit, configured to determine whether an operating wavelength of a remote optical module is within a target wavelength range, and a sending unit, configured to: when the operating wavelength of the remote optical module is beyond the target wavelength range, send a wavelength control signal to the remote optical module, where the wavelength control signal is used to indicate a target wavelength tuned by the remote optical module, and the wavelength control signal is loaded into a first optical service signal in a pilot tone manner.

For a specific process of performing the wavelength tuning method by the central office terminal according to this aspect and description of beneficial effects, refer to the foregoing first aspect. Details are not described again.

Based on the fourth aspect of the embodiments of the present invention, in an optional implementation of the fourth aspect of the embodiments of the present invention, the wavelength control signal is used to indicate a wavelength shift, and the wavelength shift is a shifted wavelength of the operating wavelength of the remote optical module relative to the target wavelength range.

Based on the fourth aspect of the embodiments of the present invention, in an optional implementation of the fourth aspect of the embodiments of the present invention, the wavelength control signal is used to indicate the target wavelength range.

Based on the fourth aspect of the embodiments of the present invention, in an optional implementation of the fourth aspect of the embodiments of the present invention, the wavelength detection unit is further configured to: receive a detection signal sent by the remote optical module, where the detection signal is loaded into a second optical service signal in the pilot tone manner, and determine, based on the detection signal, whether the operating wavelength of the remote optical module is within the target wavelength range.

Based on the fourth aspect of the embodiments of the present invention, in an optional implementation of the fourth aspect of the embodiments of the present invention, the wavelength detection unit is specifically configured to: if an intensity of a carrier frequency of the detection signal is greater than or equal to a preset value, determine that the operating wavelength of the remote optical module is within the target wavelength range.

A fifth aspect of the embodiments of the present invention provides a remote device, and the remote device includes the optical module in the third aspect or in any one of the possible implementations of the third aspect.

Another aspect of this application provides a communications system. The communications system includes the central office terminal in the fourth aspect or in any one of the possible implementations of the fourth aspect, and the remote device in the fifth aspect.

Another aspect of this application provides a readable storage medium. The readable storage medium stores instructions. When the instructions run on a network device, the network device is enabled to perform the methods in the foregoing aspects.

Another aspect of this application provides a program product that includes instructions. When the instructions run on a network device, the network device is enabled to perform the methods in the foregoing aspects.

DETAILED DESCRIPTION OF ILLUSTRATIVE EMBODIMENTS

Figure 1:
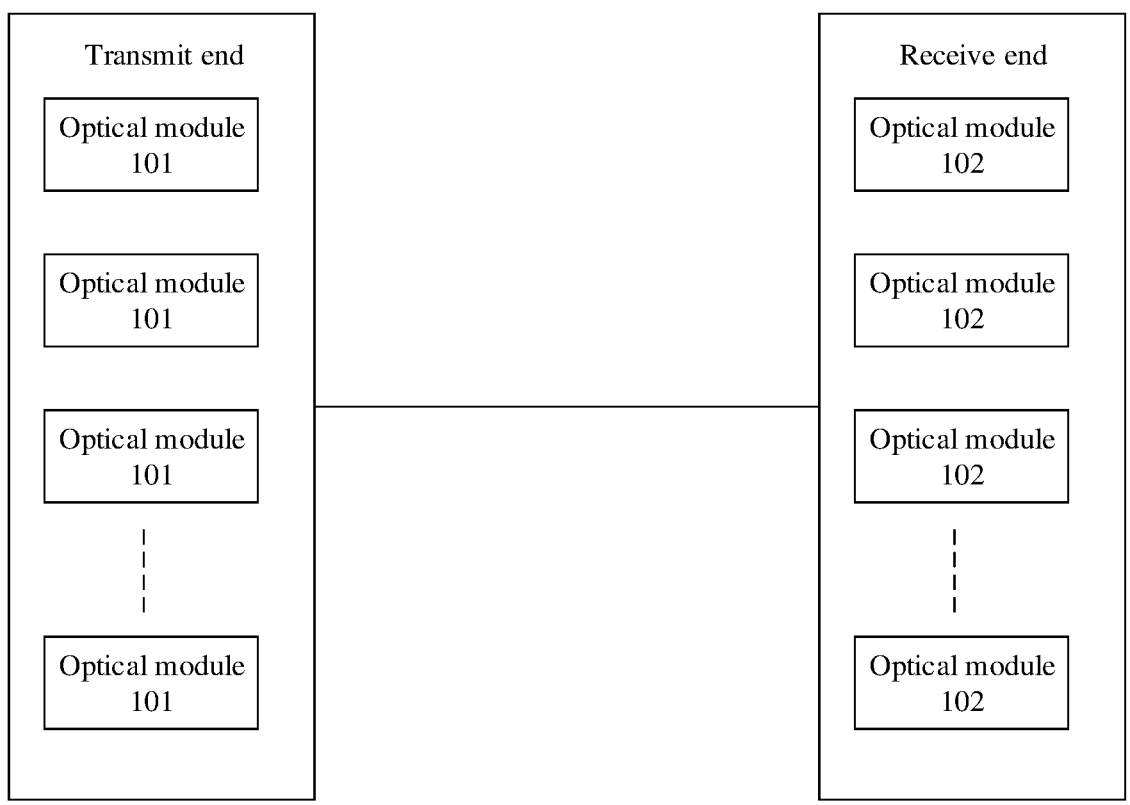
FIG. 1 is an example structure of an optical communications system according to the conventional technology.
Figure 2:
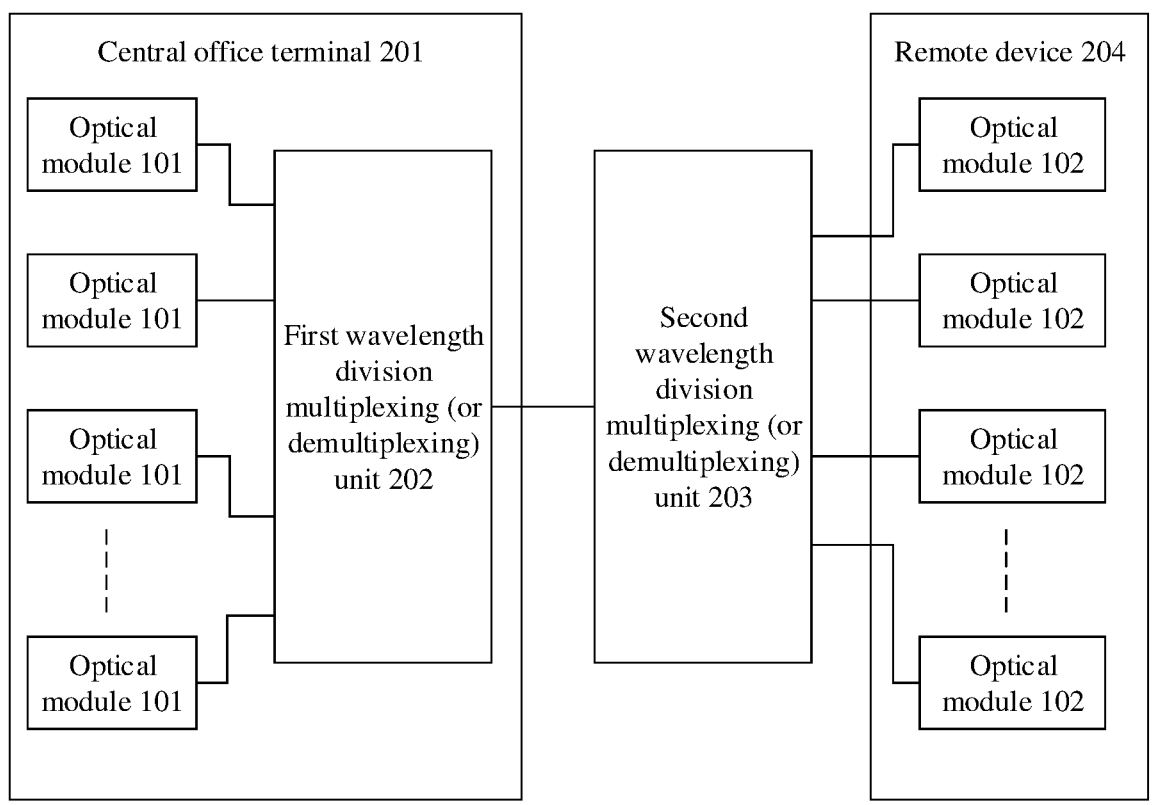
FIG. 2 is a schematic diagram of a structure of an embodiment of an optical communications system according to this application.

To better understand a wavelength tuning method provided in this application, with reference to FIG. 2, the following first provides example description for a specific structure of an optical communications system to which the method shown in this application is applied.

As shown in FIG. 2, the optical communications system shown in this embodiment includes a central office terminal 201, a first wavelength division multiplexing (or demultiplexing) unit 202, a second wavelength division multiplexing (or demultiplexing) unit 203, and a remote device 204. Optionally, by way of an example and not limitation in this embodiment, the first wavelength division multiplexing (or demultiplexing) unit 202 is arranged inside the central office terminal 201, and the second wavelength division multiplexing (or demultiplexing) unit 203 is arranged between the central office terminal 201 and the remote device 204. In another example, both the first wavelength division multiplexing (or demultiplexing) unit 202 and the second wavelength division multiplexing (or demultiplexing) unit 203 may be separately arranged between the central office terminal 201 and the remote device 204. Alternatively, at least one of the first wavelength division multiplexing (or demultiplexing) unit 202 and the second wavelength division multiplexing (or demultiplexing) unit 203 may be arranged inside the remote device 204. Alternatively, the first wavelength division multiplexing (or demultiplexing) unit 202 and the second wavelength division multiplexing (or demultiplexing) unit 203 may be implemented as one wavelength division multiplexing (or demultiplexing) unit.

A direction from the central office terminal 201 to the remote device 204 is defined as a downstream direction, and a direction from the remote device 204 to the central office terminal 201 is defined as an upstream direction. In the downstream direction, the first wavelength division multiplexing (or demultiplexing) unit 202 is configured to perform wavelength multiplexing, and the second wavelength division multiplexing (or demultiplexing) unit 203 is configured to perform wavelength division demultiplexing. In the upstream direction, the second wavelength division multiplexing (or demultiplexing) unit 203 is configured to perform wavelength multiplexing, and the first wavelength division multiplexing (or demultiplexing) unit 202 is configured to perform wavelength division demultiplexing.

Data transmission is required between the central office terminal 201 and the remote device 204 shown in this embodiment. Specifically, data transmission between the central office terminal 201 and the remote device 204 may be implemented by using passive components in the first wavelength division multiplexing (or demultiplexing) unit 202 and the second wavelength division multiplexing (or demultiplexing) unit 203. That is, a wavelength division multiplexing (or demultiplexing) function is implemented by using the passive components included in the first wavelength division multiplexing (or demultiplexing) unit 202 and the second wavelength division multiplexing (or demultiplexing) unit 203, so that data transmission between the central office terminal 201 and the remote device 204 is implemented.

A specific device type of the central office terminal 201 and a specific device type of the remote device 204 are not limited in this embodiment, provided that the central office terminal 201 can perform unified management on the remote device 204. For example, if the optical communications system shown in this embodiment is used in the 3rd generation mobile communications technology (3rd-generation, 3G), the fourth generation mobile communications technology (the fourth generation of mobile phone mobile communications technology standards, 4G), or the fifth generation mobile communications technology (5th generation mobile networks, 5G), the central office terminal 201 may be a baseband unit (BBU), and the remote device 204 may be a remote radio unit (RRU).

Figure 3:
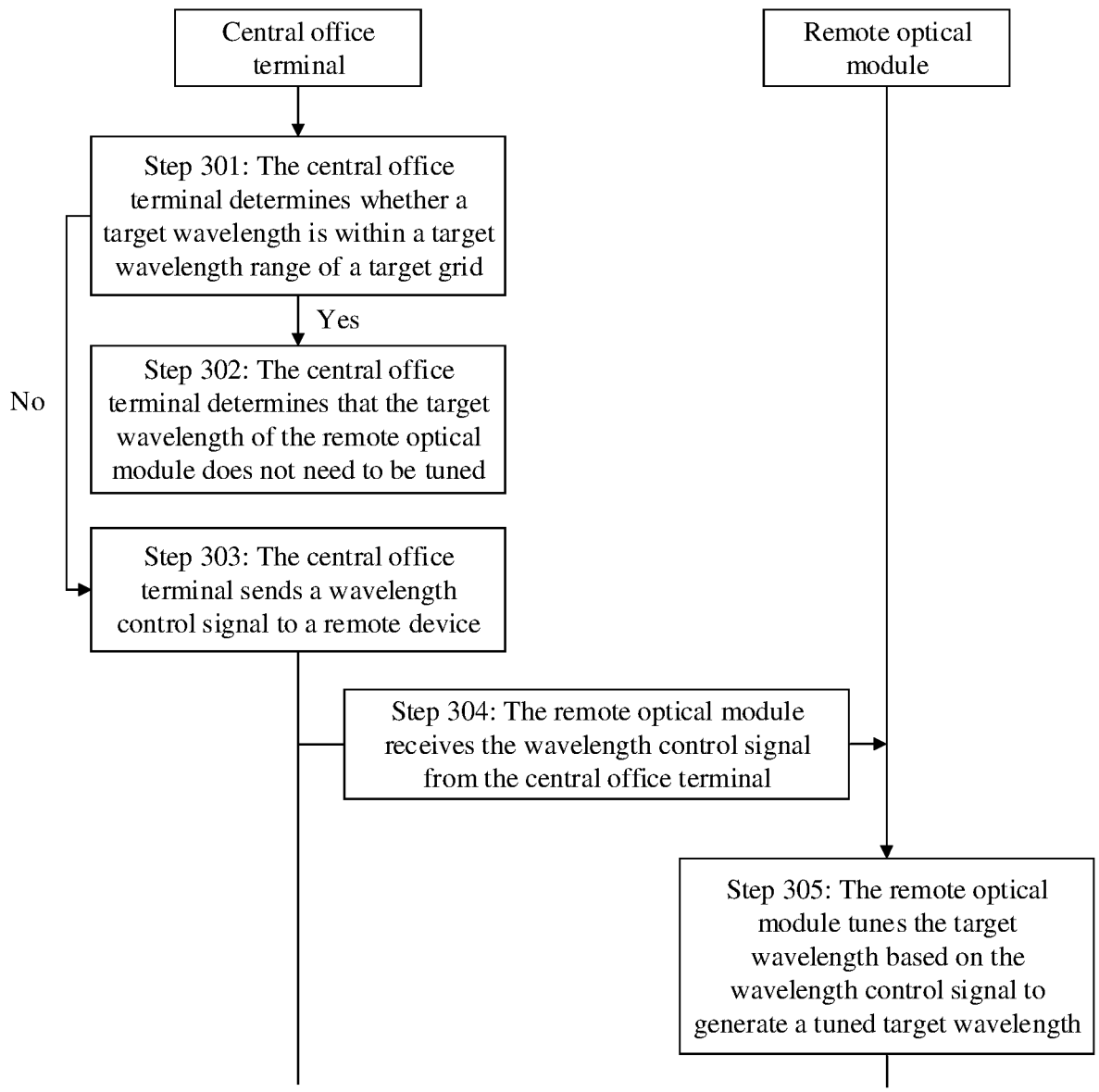
FIG. 3 is a step flowchart of an embodiment of a wavelength tuning method according to this application.

Based on the optical communications system shown in FIG. 2, the following provides example description for an embodiment of a wavelength tuning method provided in this application with reference to FIG. 3.

Step 301: A central office terminal determines whether a target wavelength is within a target wavelength range of a target wavelength channel, and if the target wavelength is within the target wavelength range of the target wavelength channel, performs step 302, or if the target wavelength is not within the target wavelength range of the target wavelength channel, performs step 303.

In this embodiment, still referring to the example shown in FIG. 2, the central office terminal 201 includes a plurality of optical modules, that is, an optical module 1, an optical module 2, . . . , and an optical module N, and the remote device 204 also includes a plurality of optical modules, that is, an optical module 1, an optical module 2, . . . , and an optical module N. In addition, the plurality of optical modules included in the central office terminal 201 may be in a one-to-one correspondence with the plurality of optical modules included in the remote device 204, so that data transmission can be performed between an optical module in the central office terminal 201 and an optical module in the remote device 204 that are corresponding to each other. For example, if the optical module N in the central office terminal 201 corresponds to the optical module N in the remote device 204, data transmission may be performed between the optical module N in the central office terminal 201 and the optical module N in the remote device 204. A specific value of N is not limited in this embodiment, provided that N is a positive integer greater than 1.

The optical module may be a centum form-factor pluggable (CFP) optical module, a small form pluggable (SFP) optical module, or the like. Each optical module includes but is not limited to a laser. Specifically, to enable all optical modules included in the remote device 204 to perform multiplexing in a wavelength division multiplexing manner by using different wavelengths, a wavelength of each laser included in the remote device 204 needs to be locked within a wavelength range. However, in actual application of a laser, wavelength drift often occurs in the laser. A laser in which wavelength drift has occurred cannot implement wavelength division multiplexing. Specifically, the wavelength of the laser is affected by various factors, and as a result, the wavelength of the laser drifts. These factors include but are not limited to an operating temperature of the laser, a laser current, a laser voltage, a vibration source, or electrical noise.

A specific type of the laser is not limited in this embodiment. In this embodiment, that the laser is a distribution feedback (DFB) is used as an example.

For the central office terminal shown in this embodiment, to detect whether wavelength drift occurs in the optical module included in the remote device, first, the central office terminal may determine a remote optical module in the remote device. The remote optical module may be any one of the plurality of optical modules included in the remote device. Second, the central office terminal determines whether a target wavelength of the remote optical module is within the target wavelength range of the target wavelength channel. Still referring to the foregoing example, by using the N optical modules included in the remote device as an example, the target wavelength may be an operating wavelength currently used by any one of the N optical modules.

The central office terminal shown in this embodiment is configured to control the wavelength of each laser included in the remote device to be within a corresponding wavelength range, so that wavelength drift does not occur in each laser of the remote device. Further, each laser of the remote device can implement wavelength division multiplexing.

Specifically, the central office terminal shown in this embodiment may first determine a wavelength division multiplexing (or demultiplexing) unit of a central office. The wavelength division multiplexing (or demultiplexing) unit shown in this embodiment has N wavelength channels. More specifically, a quantity of wavelength channels included in the wavelength division multiplexing (or demultiplexing) unit of the central office as determined by the central office terminal is equal to a quantity of optical modules included in the remote device. The wavelength channels included in the wavelength division multiplexing (or demultiplexing) unit may be in a one-to-one correspondence with the optical modules included in the remote device. For example, a wavelength channel N included in the wavelength division multiplexing (or demultiplexing) unit corresponds to the optical module N included in the remote device. The following describes, by using Table 1 as an example, the wavelength division multiplexing (or demultiplexing) unit determined by the central office terminal.

TABLE 1

| Wavelength division multiplexing (or demultiplexing) unit | Optical module of a remote device |
|---|---|
| Wavelength channel 1 | Optical module 1 |
| Wavelength channel 2 | Optical module 2 |
| ... | ... |
| Wavelength channel N | Optical module N |

In this embodiment, when an optical module j in the remote device (j is an integer from 1 to N in Table 1) performs data transmission with the optical module in the central office terminal in the wavelength division multiplexing manner, a wavelength of the optical module j in the remote device needs to be within a wavelength range of a wavelength channel j. The optical module j of the remote device can successfully perform data transmission with the optical module in the central office terminal only when the wavelength of the optical module j in the remote device is within the wavelength range of the wavelength channel j.

It can be learned that the wavelength division multiplexing (or demultiplexing) unit shown in this embodiment includes wavelength channels respectively corresponding to the N optical modules included in the remote device, and the wavelength channel shown in this embodiment is a wavelength range. Therefore, in this embodiment, a target wavelength range indicated by the target wavelength channel is the target wavelength range.

It can be learned that, by using the wavelength division multiplexing (or demultiplexing) unit shown in Table 1, the central office terminal determines wavelength ranges corresponding to different optical modules of the remote device, that is, $\lambda_{i\_min} < \lambda < \lambda_{i\_max}$. $\lambda$ is a wavelength of a laser included in the optical module N of the remote device, $\lambda_{i\_min}$ is a minimum value of a wavelength range of the wavelength channel N, and $\lambda_{i\_max}$ is a maximum value of the wavelength range of the wavelength channel N.

When the central office terminal has determined the wavelength division multiplexing (or demultiplexing) unit, the central office terminal may determine the target wavelength channel in the wavelength division multiplexing (or demultiplexing) unit, where the target wavelength channel is a wavelength channel corresponding to the remote optical module.

Optionally, when the optical communications system shown in FIG. 2 is initialized, the target wavelength of the remote optical module is initialized. The target wavelength of the remote optical module accesses a wavelength division multiplexing system, and the central office terminal performs step 301 shown in this embodiment in a periodic polling manner. If the central office terminal detects that the target wavelength of the remote optical module is not within the target wavelength range of the target wavelength channel, the target wavelength needs to be tuned as shown in subsequent steps, so that the remote optical module can successfully access the wavelength division multiplexing system, or if the central office terminal detects that the target wavelength of the remote optical module is within the target wavelength range of the target wavelength channel, the central office terminal may perform step 301 again after a preset time interval. Specific duration of the preset time interval is not limited in this embodiment.

Step 302: The central office terminal determines that the target wavelength of the remote optical module does not need to be tuned.

In this embodiment, when the central office terminal determines that a target wavelength of the laser of the remote optical module is in a corresponding target wavelength channel, it indicates that no wavelength drift occurs in the laser of the remote optical module, and the central office terminal does not need to tune the target wavelength of the remote optical module.

Optionally, re-detection duration may be set for the central office terminal. After step 302 is performed, the central office terminal starts a timer to perform timing. If timing duration of the timer reaches the re-detection duration, the central office terminal performs step 301 again.

Step 303: The central office terminal sends a wavelength control signal to the remote device.

When the central office terminal determines that the target wavelength of the laser of the remote optical module is not in the corresponding target wavelength channel, it indicates that wavelength drift occurs in the laser of the remote optical module, and the central office terminal determines that the target wavelength of the remote optical module needs to be tuned.

Figure 4:
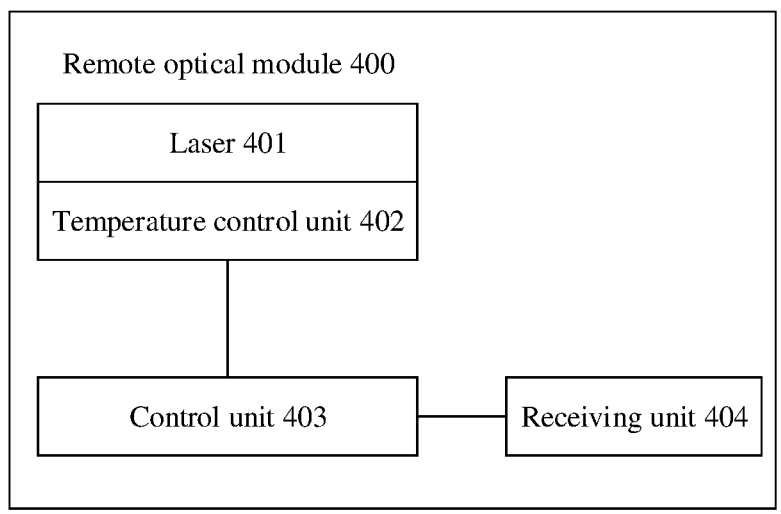
FIG. 4 is an example diagram of a structure of an embodiment of a remote optical module according to this application.

To better understand a process in which the central office terminal shown in this embodiment tunes the wavelength of the laser of the remote optical module, the following first provides example description for a specific structure of the remote optical module with reference to FIG. 4.

It may be learned from FIG. 4 that a remote optical module 400 shown in this embodiment includes but is not limited to a laser 401, a temperature control unit 402, and a control unit 403. It should be noted that description of a specific structure of the remote optical module 400 in this embodiment is an optional example and is not limited.

As shown in FIG. 4, the laser 401 and the temperature control unit 402 are attached to each other, and the control unit 403 is electrically connected to the temperature control unit 402. Because a wavelength value of the laser 401 is in a positive correlation with an ambient temperature in which the laser 401 is located, a temperature of the temperature control unit 402 may be adjusted, so as to adjust a temperature (or tune a wavelength) of the laser 401.

A specific device type of the temperature control unit 402 is not limited in this embodiment, provided that the temperature control unit 402 can adjust the temperature under control of the control unit 403, so as to tune the wavelength of the laser 401. For example, the temperature control unit may be a thermoelectric cooler (TEC) or a thermistor heater. The control unit 403 may adjust the temperature of the temperature control unit 402 by controlling a current flowing through the temperature control unit 402, so as to tune the wavelength of the laser 401.

It can be learned that the central office terminal shown in this embodiment may send the wavelength control signal to the remote optical module of the remote device.

The wavelength control signal is used to indicate the remote optical module to tune the wavelength of the laser, so that the wavelength of the laser is within a wavelength range of the target wavelength channel. Specific content included in the wavelength control signal is not limited in this embodiment.

For example, the wavelength control signal may be used to indicate a wavelength shift, and the wavelength shift is used to indicate the central office terminal to tune the laser of the remote optical module based on the wavelength shift, so that a target wavelength obtained after being tuned based on the wavelength shift is in the target wavelength channel.

Specifically, the wavelength shift is used to indicate a shifted wavelength of an operating wavelength currently used by the remote optical module relative to the target wavelength channel. For example, if the target wavelength range indicated by the target wavelength channel is from 1309 nanometers to 1311 nanometers. When the operating wavelength currently used by the remote optical module is 1312 nanometers, the central office terminal may determine that the wavelength of the remote optical module shifts. Therefore, the central office terminal may determine that the wavelength shift is any value between −1 nanometer and −3 nanometers.

Optionally, if the operating wavelength currently used by the remote optical module is less than a minimum value of the target wavelength range, the wavelength shift is a positive number, or if the operating wavelength currently used by the remote optical module is greater than a maximum value of the target wavelength range, the wavelength shift is a negative number.

For another example, the wavelength control signal may be used to indicate the target wavelength range of the target wavelength channel. Specifically, when the central office terminal determines that the wavelength of the remote optical module shifts, the central office terminal may directly determine a target wavelength range of the target wavelength channel corresponding to the remote optical module. Therefore, the central office terminal may directly tune the wavelength of the laser of the remote optical module based on the target wavelength range, so that a wavelength of the laser after being tuned is within the target wavelength range.

Step 304: The remote optical module receives the wavelength control signal from the central office terminal.

The remote optical module shown in this embodiment may perform periodic polling on the wavelength control signal. If the wavelength control signal is received through periodic polling, performing of step 305 is triggered.

Step 305: The remote optical module tunes a wavelength based on the wavelength control signal.

In this embodiment, the remote optical module on which wavelength drift occurs receives the wavelength control signal, and the remote optical module may adjust the temperature of the temperature control unit in the remote optical module based on the wavelength control signal, so as to adjust an operating temperature of the laser, thereby tuning the wavelength of the laser. Therefore, a wavelength of the remote optical module after being tuned is within the wavelength range of the target wavelength channel. The following describes how the remote optical module shown in this embodiment specifically tunes the wavelength.

First, the remote optical module shown in this embodiment may obtain a preset determined temperature control list, and the temperature control list shown in this embodiment may include a correspondence between different wavelength ranges and different temperatures. How the remote optical module specifically generates the temperature control list is not limited in this embodiment, provided that the temperature control list can reflect the correspondence between different temperatures and different wavelengths when an optical output power of the remote optical module remains unchanged. To better understand the temperature control list shown in this embodiment, the following provides example description for the temperature control list with reference to Table 2.

TABLE 2

| Temperature T | Wavelength |
| --- | --- |
| T = 25° C. | λ = 1309 nm |
| T = 35° C. | λ = 1310 nm |
| T = 45° C. | λ = 1311 nm |

TABLE 2-continued

| Temperature T | Wavelength |
| --- | --- |
| T = 55° C. | λ = 1312 nm |
| ... | ... |

Second, the remote optical module determines a tuned target wavelength based on the wavelength control signal, where the tuned target wavelength is in the target wavelength range of the target wavelength channel. Specifically, the remote optical module tunes the wavelength of the laser to the tuned target wavelength, so that the wavelength of the laser does not drift.

Still referring to the description of the wavelength control signal shown in step 304, optionally, if the wavelength control signal is used to indicate a wavelength shift, the remote optical module may determine the tuned target wavelength based on the wavelength shift.

For example, if the wavelength shift indicated by the wavelength control signal sent by the central office terminal to the remote optical module is 2 nanometers, the remote optical module may determine that a current actual wavelength is shifted by 2 nanometers. If the wavelength shift is +2, the tuned target wavelength is equal to a sum of the current actual wavelength and the wavelength shift. Specifically, for example, if the current actual wavelength is 1308 nanometers, and the target wavelength range is from 1309 nanometers to 1311 nanometers, the remote optical module determines that the tuned target wavelength=1308+2=1310 nanometers. It can be learned that the tuned target wavelength 1310 nanometers, which is obtained after being tuned by the remote optical module from the current actual wavelength based on the wavelength shift, is between 1309 nanometers and 1311 nanometers, that is, within the target wavelength range.

Optionally, if the wavelength control signal is used to indicate the target wavelength range, the remote optical module may determine that the tuned target wavelength is any value in the target wavelength range. For example, if the target wavelength range is from 1309 nanometers to 1311 nanometers, the remote optical module may determine that the tuned target wavelength is 1310 nanometers.

Third, the remote optical module queries the temperature control list, to determine a target temperature corresponding to the tuned target wavelength in the temperature control list.

For example, when the remote optical module determines that the tuned target wavelength is 1310 nanometers, the remote optical module may determine a target temperature T=35° C. corresponding to 1310 nanometers based on the temperature control list.

Finally, the remote optical module may adjust the operating temperature of the laser of the remote optical module based on the target temperature, so that the wavelength of the laser is the tuned target wavelength, and the wavelength of the laser is in the target wavelength channel. Therefore, the remote optical module can perform wavelength division multiplexing by using the tuned target wavelength.

Still using FIG. 4 as an example, the control unit 403 of the remote optical module may obtain the target temperature, and then the control unit 403 may control a magnitude of the current flowing through the temperature control unit 402, so that the temperature of the temperature control unit 402 is the target temperature. For example, when the control unit 403 determines that the target temperature T=35° C., the control unit 403 may control the magnitude of the current flowing through the temperature control unit 402, so that the temperature of the temperature control unit 402 is 35° C. Because the temperature control unit 402 and the laser 401 are attached to each other, the wavelength of the laser 401 may be tuned by adjusting the temperature of the temperature control unit 402. Specifically, for example, when the target temperature of the control unit 403 is 35° C., a wavelength λ of the laser 401 is 1310 nm.

Optionally, the remote optical module of the optical communications system shown in this embodiment may be initialized based on the temperature control list.

First, the temperature control unit 402 of the remote optical module detects a current temperature $T_{typ}$ of the temperature control unit 402, second, the remote optical module may calculate a difference between each temperature included in the temperature control list and the current temperature $T_{typ}$, that is, $\min|T_i-T_{typ}|$, where $T_i$ is any temperature included in the temperature control list. The remote optical module determines a wavelength corresponding to a temperature with a smallest difference value as the wavelength of the laser of the remote optical module, that is, a difference between the temperature $T_i$ included in the temperature control list and the current temperature $T_{typ}$ is the minimum, and third, the remote optical module determines that a wavelength corresponding to the temperature $T_i$ is the wavelength of the laser of the remote optical module.

Optionally, when the corresponding temperature control list needs to be generated for the remote optical module, the remote optical module may be connected to a detection module. The detection module is configured to generate the temperature control list shown in Table 2 based on a correspondence between different wavelengths of the remote optical module and different temperatures and store the temperature control list into a memory of the remote optical module.

Figure 5:
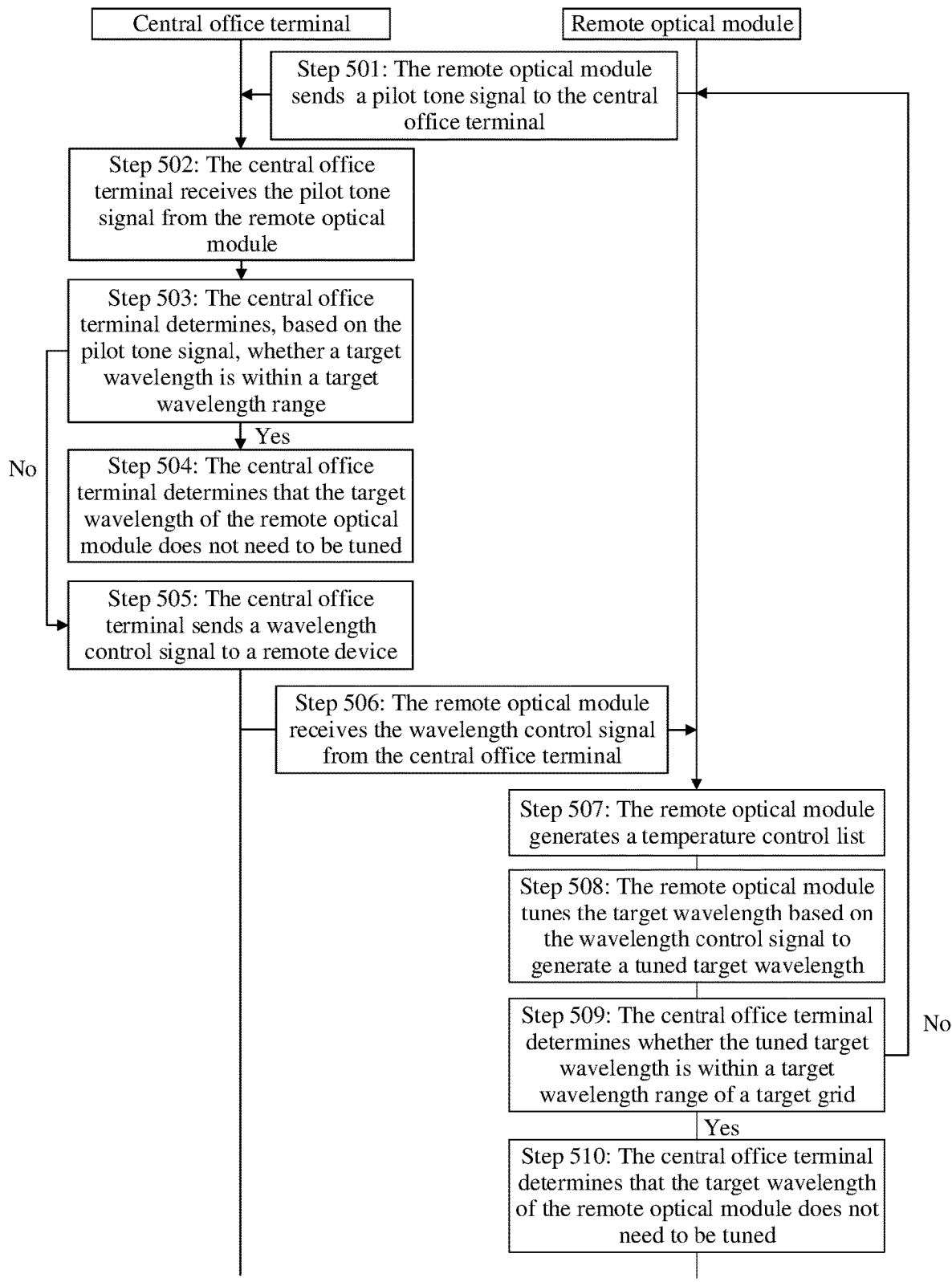
FIG. 5 is a step flowchart of another embodiment of a wavelength tuning method according to this application.

Based on the wavelength tuning method shown in FIG. 3, with reference to FIG. 5, the following describes in detail a process of determining whether the target wavelength is within the target wavelength range of the target wavelength channel shown in the wavelength tuning method.

Step 501: A remote optical module sends a pilot tone signal to a central office terminal.

The remote optical module shown in this embodiment encodes the control signal and then loads the control signal onto a laser, and sends the pilot tone signal to the central office terminal by using the laser. For specific description of the remote optical module, refer to the foregoing embodiment. Details are not described again.

Step 502: The central office terminal receives the pilot tone signal from the remote optical module.

Different lasers in a remote device send different carrier frequencies of pilot tone signals, which generally range from dozens of kilohertz (KHz) to one megahertz (MHz). Therefore, the central office terminal receives the pilot tone signals that are sent by all lasers in the remote device by using different carrier frequencies.

Figure 6:
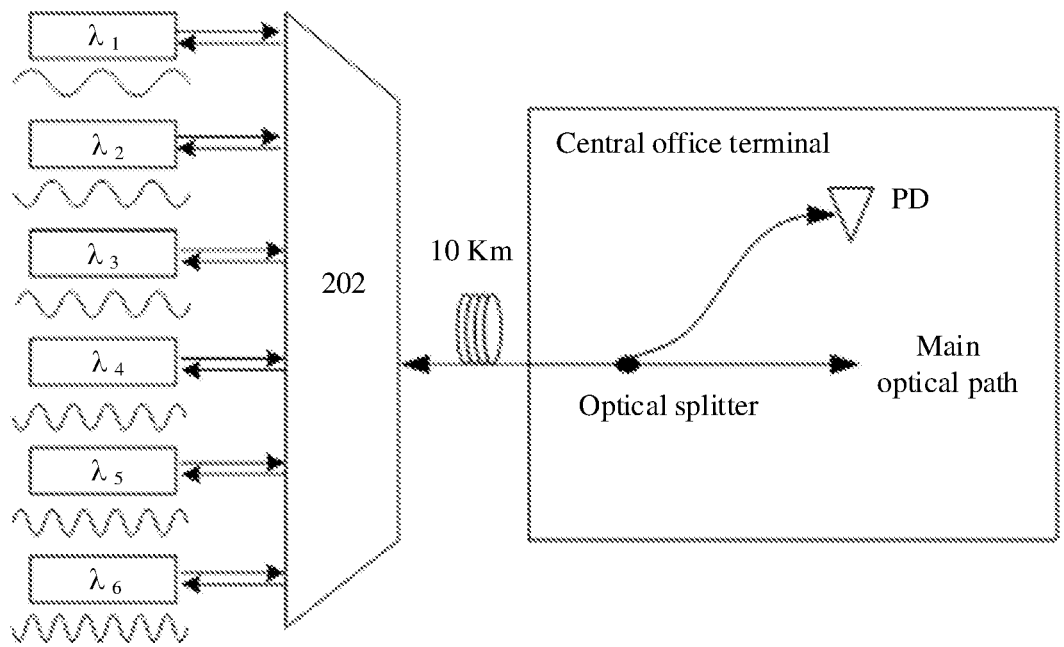
FIG. 6 is an example application diagram according to this application.

To be specific, by using FIG. 6 as an example, when the remote device includes six optical modules, wavelengths of the six optical modules are respectively $\lambda_1, \lambda_2, \ldots,$ and $\lambda_6$ shown in FIG. 6. The central office terminal may receive six pilot tone signals sent by the six remote optical modules. When the central office terminal shown in this embodiment receives the pilot tone signals sent by all remote optical modules in the remote device, the central office terminal may determine, based on a pre-configured algorithm, a correspondence between any pilot tone signal and a remote optical module, that is, any one of the pilot tone signals is sent by a corresponding remote optical module.

Step 503: The central office terminal determines, based on the pilot tone signal, whether a target wavelength is within a target wavelength range, and if the target wavelength is within the target wavelength range, performs step 504, or if the target wavelength is not within the target wavelength range, performs step 505.

Specifically, the central office terminal shown in this embodiment may receive the pilot tone signals of the remote optical modules by using an arranged photodetector (PD), and determines one by one whether a target wavelength of a remote optical module that sends the pilot tone signal is within the target wavelength range based on all the received pilot tone signals.

Figure 7:
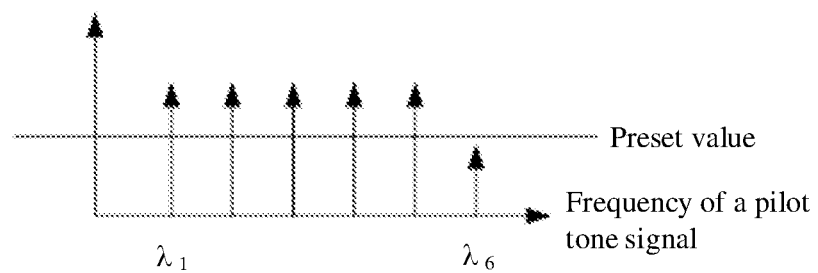
FIG. 7 is another example application diagram according to this application.

First, referring to FIG. 7, the central office terminal may determine a correspondence shown in FIG. 7. The correspondence includes a frequency of the pilot tone signal of the remote optical module and an intensity of a carrier frequency of the pilot tone signal that are detected by the central office terminal. It can be learned that the central office terminal shown in this embodiment may determine, by using the correspondence shown in FIG. 7, a correspondence between the frequency of the pilot tone signal of the remote optical module and the intensity of the carrier frequency of the pilot tone signal.

Second, the central office terminal determines, based on the correspondence, whether the intensity of the carrier frequency $V_i$ of the pilot tone signal of the remote optical module is greater than or equal to a preset value $V_{th}$. A specific value of the preset value $V_{th}$ is not limited in this embodiment. If the intensity of the carrier frequency $V_i$ is greater than or equal to the preset value $V_{th}$, it indicates that the target wavelength of the remote optical module used to send the pilot tone signal is within the target wavelength range, which further indicates that no wavelength drift occurs in a laser of the remote optical module, and the target wavelength of the laser does not need to be tuned.

If the intensity of the carrier frequency $V_i$ is less than the preset value $V_{th}$, it indicates that the target wavelength of the remote optical module used to send the pilot tone signal is not within the target wavelength range, which further indicates that wavelength drift occurs in the laser of the remote optical module, and the target wavelength of the laser needs to be tuned.

For example, still using FIG. 7 as an example, because intensities of carrier frequencies $V_1$ of the pilot tone signals respectively corresponding to $\lambda_1, \lambda_2, \ldots,$ and $\lambda_5$ are all greater than the preset value $V_{th}$, the central office terminal does not need to tune $\lambda_1, \lambda_2, \ldots,$ and $\lambda_5$. However, an intensity of a carrier frequency $V_i$ of the pilot tone signal corresponding to $\lambda_6$ is less than the preset value $V_{th}$, it indicates that $\lambda_6$ needs to be tuned.

Step 504: The central office terminal determines that the target wavelength of the remote optical module does not need to be tuned.

Step 505: The central office terminal sends a wavelength control signal to the remote device.

Step 506: The remote optical module receives the wavelength control signal from the central office terminal.

For a specific process of performing step 504 to step 506 in this embodiment, refer to step 303 to step 305 shown in FIG. 3. The specific performing process is not limited.

Step 507: The remote optical module generates a temperature control list.

A sequence for performing step 507 shown in this embodiment and the foregoing steps 501 to 506 is not limited. A specific process of generating the temperature control list by the remote optical module is described in this step. For specific description of the temperature control list, refer to the embodiment shown in FIG. 3.

Still with reference to FIG. 4, when an output power P of the remote optical module is ensured to be unchanged, the control unit 403 may first adjust the temperature of the temperature control unit 402 to $T_0$, record a wavelength $\lambda_0$ at this time, and store a correspondence between $T_0$ and $\lambda_0$ into the temperature control list. By analogy, when the output power P of the remote optical module is ensured to be unchanged, the control unit 403 may first adjust the temperature of the temperature control unit 402 to $T_n$, record a wavelength $\lambda_n$ at this time, and store a correspondence between $T_n$ and $\lambda_n$ into the temperature control list. For the temperature control list, still refer to Table 2.

Step 508: The remote optical module tunes the target wavelength based on the wavelength control signal to generate a tuned target wavelength.

It may be learned from the foregoing step 305 that the remote optical module first determines the tuned target wavelength $\lambda$ based on the wavelength control signal. The following describes how to tune the target wavelength of the laser if all wavelengths included in the temperature control list are not equal to the tuned target wavelength $\lambda$.

First, the remote optical module determines a target channel, where the tuned target wavelength $\lambda$ is in the target channel, a maximum cut-off wavelength included in the target channel is $\lambda_{i\_max}$, and a minimum cut-off wavelength included in the target channel is $\lambda_{i\_min}$, Second, the remote optical module determines a reference wavelength $\lambda_i$, where the reference wavelength $\lambda_i$ is a wavelength that is in the wavelengths included in the temperature control list and that has a smallest difference from the tuned target wavelength $\lambda$, and determines an adjacent wavelength $\lambda_{i+1}$ included in the temperature control list, where the adjacent wavelength is a wavelength included in the temperature control list and adjacent to the reference wavelength $\lambda_i$.

Optionally, in the temperature control list, there may be zero wavelengths between the adjacent wavelength $\lambda_{i+1}$ and the reference wavelength $\lambda_i$, or in the temperature control list, there may be at least one wavelength between the adjacent wavelength $\lambda_{i+1}$ and the reference wavelength $\lambda_i$. This is not specifically limited in this embodiment.

Third, the remote optical module may determine a target temperature T based on the maximum cut-off wavelength $\lambda_{i\_max}$ and the minimum cut-off wavelength $\lambda_{i\_min}$ of the target channel, and the adjacent wavelength.

Specifically, the remote optical module may calculate the target temperature T according to the following formula:
$T = T_i + (T_{i+1} - T_i) * (\lambda_{i\_center} - \lambda) / (\lambda_{i+1} - \lambda_i)$, where $\lambda_{i\_center} = \frac{1}{2} * (\lambda_{i\_max} + \lambda_{i\_min})$, and $T_{i+1}$ is a temperature that is in the temperature control list and that corresponds to the adjacent wavelength $\lambda_{i+1}$.

For a specific process in which the remote optical module tunes the wavelength of the laser of the remote optical module based on the target temperature T, refer to FIG. 3. Details are not described in this embodiment.

Step 509: The central office terminal determines whether the tuned target wavelength is within the target wavelength range of the target wavelength channel, and if the tuned target wavelength is within the target wavelength range, performs step 510, or if the tuned target wavelength is not within the target wavelength range, performs step 501 again.

In this embodiment, after the remote optical module tunes the target wavelength of the laser to generate the tuned target wavelength, the central office terminal needs to re-determine whether the tuned target wavelength is within the target wavelength range.

For a specific process in which the central office terminal determines whether the tuned target wavelength is within the target wavelength range, refer to the foregoing specific process in which the central office terminal determines whether the target wavelength is within the target wavelength range. Details about a specific execution process are not described again.

The central office terminal shown in this embodiment may determine whether a quantity of times that the tuned target wavelength is not within the target wavelength range of the target wavelength channel is greater than or equal to a preset threshold. If the quantity of times that the tuned target wavelength is not within the target wavelength range of the target wavelength channel is greater than or equal to the preset threshold, it is determined that the remote optical module needs to be replaced, or if the quantity of times that the tuned target wavelength is not within the target wavelength range of the target wavelength channel is less than the preset threshold, step 501 is performed again.

Step 510: The central office terminal determines that the target wavelength of the remote optical module does not need to be tuned.

For a specific execution process of step 510 shown in this embodiment, refer to step 302 shown in FIG. 3. Details are not described again.

Figure 8:
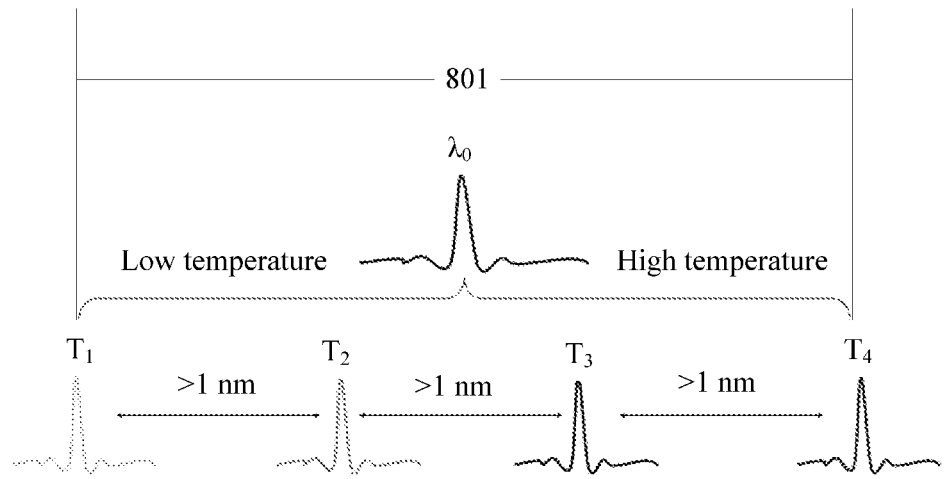
FIG. 8 is another example application diagram according to this application.

With reference to FIG. 8, the following provides example description for a process in which an optical communications system shown in this embodiment implements wavelength extension.

Specifically, a target wavelength of any remote laser included in a remote device is concentrated on one of a plurality of channels. A channel is associated with each upstream communications channel, and one of the plurality of channels may correspond to one upstream channel.

For example, as shown in FIG. 8, if a wavelength of a remote optical module is $\lambda_0$, a channel corresponding to the wavelength $\lambda_0$ is a channel 801 shown in FIG. 8. In an existing solution, a laser corresponds to the channel 801, and a wavelength of the laser is $\lambda_0$. In addition, in an existing optical communications system, lasers corresponding to different channels have different encoding manners. It can be learned that, in the existing solution, the channel 801 is in a one-to-one correspondence with the wavelength $\lambda_0$.

However, in this embodiment, extension of a correspondence between any channel that is between the central office terminal and the remote device and a wavelength can be implemented. To be specific, a correspondence between one channel and M wavelengths can be implemented. A specific value of M is not limited in this embodiment, provided that M is a positive integer greater than 1. In this embodiment, an example shown in FIG. 8 is used, that is, an example in which M is 4 is used for example description, and a correspondence between the channel 801 and four wavelengths may be implemented in this embodiment.

Four wavelengths corresponding to the channel 801 are respectively $\lambda_{-2}$, $\lambda_{-1}$, $\lambda_{+1}$ and $\lambda_{+2}$, where $\lambda_{-2}$, $\lambda_{-1}$, $\lambda_{+1}$ and $\lambda_{+2}$ are within the channel 801, and a magnitude of $\lambda_{-2}$, a magnitude of $\lambda_{-1}$, a magnitude of $\lambda_{+1}$, and a magnitude of $\lambda_{+2}$ are gradually increase. Specific magnitudes of $\lambda_{-2}$, $\lambda_{-1}$, $\lambda_{+1}$, and $\lambda_{+2}$ are not limited in this embodiment. In this embodiment, for example, if a length of the channel 801 is 4 nm, $\lambda_{-2} = \lambda_{0-1.5\ nm}$, $\lambda_{-1} = \lambda_{0-0.5\ nm}$, $\lambda_{+1} = \lambda_{0+0.5\ nm}$, and $\lambda_{+2} = \lambda_{0+1.5\ nm}$.

In this embodiment, a temperature T corresponding to any wavelength of $\lambda_{-2}$, $\lambda_{-1}$, $\lambda_{+1}$, and $\lambda_{+2}$ may be determined by generating the temperature control list. For specific description of the temperature control list, refer to the foregoing description. Details are not described again. In this example, a temperature corresponding to $\lambda_{-2}$ is $T_1$, a temperature corresponding to $\lambda_{-1}$ is $T_2$, a temperature corresponding to $\lambda_{+1}$ is $T_3$, and a temperature corresponding to $\lambda_{+2}$ is $T_4$. Specifically, in this example, $T_1$ is 25° C., $T_2$ is 35° C., $T_3$ is 45° C., and $T_4$ is 55° C.

In a specific process of deploying the optical communications system, one laser may be configured for each of wavelengths $\lambda_{-2}$, $\lambda_{-1}$, $\lambda_{+1}$, and $\lambda_{+2}$. It can be learned that four lasers may be correspondingly configured for the channel 801. Optionally, coding schemes of a plurality of lasers corresponding to a same channel may be the same.

Specifically, in the four lasers corresponding to the channel 801, a wavelength corresponding to a laser 1 is $\lambda_{-2}$, a wavelength corresponding to a laser 2 is $\lambda_{-1}$, a wavelength corresponding to a laser 3 is $\lambda_{+1}$, and a wavelength corresponding to the laser 4 is $\lambda_{+2}$.

For the laser 1, if the central office terminal determines, by using the foregoing method embodiment, that the wavelength of the laser 1 drifts, the remote optical module may tune the wavelength of the laser 1 by using the foregoing method embodiment. For example, the temperature of the temperature control unit 402 is adjusted to 25° C.

For the laser 2, if the central office terminal determines, by using the foregoing method embodiment, that the wavelength of the laser 2 drifts, the remote optical module may tune the wavelength of the laser 2 by using the foregoing method embodiment. For example, the temperature of the temperature control unit 402 is adjusted to 35° C. and so on. Details are not described again.

The following describes beneficial effects of the method shown in this application.

In this application, the central office terminal monitors the remote optical module of the remote device. If the central office terminal monitors wavelength drift of the laser of the remote optical module, the central office terminal sends the wavelength control signal to the remote optical module. The remote optical module correspondingly adjusts the temperature of the temperature control unit 402 based on the wavelength control signal, so that the tuned target wavelength is within the target wavelength range, and the laser of the remote optical module can successfully access the wavelength division multiplexing system. It can be learned that in the method shown in this application, the wavelengths of the plurality of remote optical modules of the remote device can be tuned, so that efficiency of tuning the wavelengths of the remote optical modules is improved.

Although the wavelength is tuned based on the temperature, the wavelength is tuned to an ITU grid, for example, $\lambda_{0\pm2.5}$ GHz, by using an etalon wavelength locker. However, in this application, the target wavelength is tuned to be within a target wavelength range of a filter, for example, within a range of 10 nm.

It can be learned that by using the method for tuning the target wavelength shown in this embodiment, a low-cost, high-reliability, maintainable, and protected wavelength division transmission system can be implemented. In addition, data exchange may be directly performed between the central office terminal and the remote optical module by using an optical physical control channel (the pilot tone signal), without relying on the network management system (or another independent control channel) to transmit data. Therefore, data transmission efficiency is improved.

In the method shown in this embodiment, a wavelength of a laser may be tuned by reusing an industrial chain of a conventional WDM coarse wavelength division multiplexer, that is, a combination of a laser and a temperature control unit. A quantity of wavelengths is increased by N times with low costs. For example, a quantity of wavelengths is increased by two times or four times, so that utilization efficiency of a frequency band is improved.

In addition, the central office terminal shown in this embodiment may receive, by using the PD, all pilot tone signals sent by the remote optical modules in the remote device, and a remote optical module in which wavelength drift occurs may be detected based on a pilot tone signal. It can be learned that, in this embodiment, in a process of detecting a remote optical module in which wavelength drift occurs, overheads for the pilot tone can be reduced, and fault information of the remote optical module is monitored and reported without relying on the network management system and the remote device.

Because the central office terminal shown in this embodiment can receive the pilot tone signals of all remote optical modules of the remote device by using the PD, costs are reduced.

In the method shown in this embodiment, the target wavelength of each remote optical module included in the remote device can be monitored by using the remote device. A monitoring process does not rely on the network management system, so that monitoring efficiency and accuracy are improved.

Optionally, as shown in the foregoing embodiment, the central office terminal monitors the wavelength of the remote optical module. This embodiment sets no limitation on a specific execution body for implementing the foregoing method embodiment. For example, any unit included in the central office terminal or a central office optical module included in the central office terminal may perform the foregoing functions of the central office terminal. The central office optical module is in a one-to-one correspondence with the remote optical module, that is, the central office optical module and the remote optical module have a primary-secondary relationship. The central office optical module is used as a primary control module to monitor the wavelength of the remote optical module as a controlled module. For a specific monitoring process, refer to the foregoing description. Details are not described again.

Figure 9:
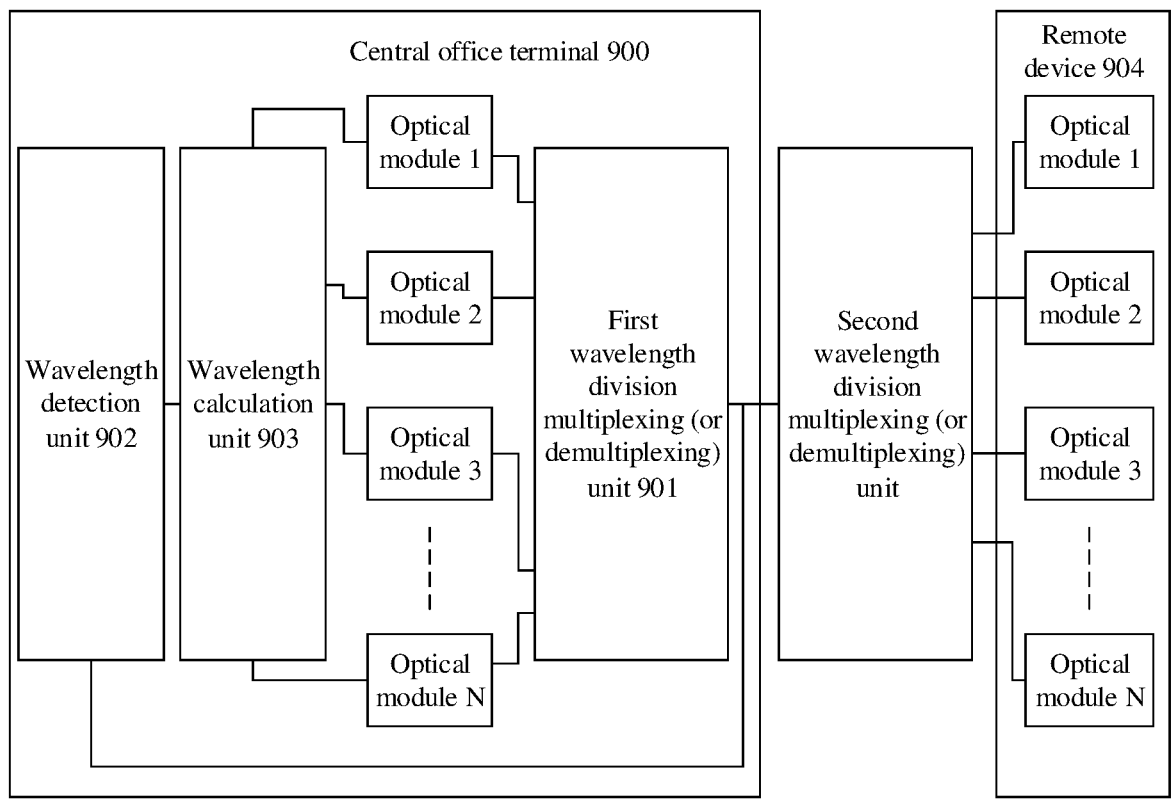
FIG. 9 is a schematic diagram of a structure of another embodiment of a communications system according to the present invention.

With reference to FIG. 9, the following provides example description for a specific structure of the central office terminal used for performing the above wavelength tuning method.

As shown in FIG. 9, the central office terminal 900 specifically includes a first wavelength division multiplexing (or demultiplexing) unit 901. For specific description of the first wavelength division multiplexing (or demultiplexing) unit 901, refer to FIG. 2. Details are not described again. To be specific, the first wavelength division multiplexing (or demultiplexing) unit 901 shown in this embodiment is an optional structure. In another example, the central office terminal 900 may not include the first wavelength division multiplexing (or demultiplexing) unit 901. The central office terminal 900 further includes a wavelength detection unit 902. The wavelength detection unit 902 is configured to determine whether a target wavelength of a remote optical module is within a target wavelength range. The target wavelength range corresponds to the remote optical module. For a specific execution process, refer to the foregoing embodiment. Details are not described again.

The central office terminal 900 further includes a wavelength calculation unit 903, configured to: when it is determined that the target wavelength of the remote optical module is beyond the target wavelength range, generate a wavelength control signal. For a specific obtaining process, refer to the foregoing embodiment. Details are not described again.

The wavelength detection unit 902 is further configured to send the wavelength control signal to the remote optical module. The wavelength control signal is used to indicate a tuned target wavelength, where the tuned target wavelength is within the target wavelength range. For specific description of the wavelength control signal, refer to the foregoing method embodiment. Details are not described again.

The central office terminal 900 shown in this embodiment further includes N optical modules, and the optical modules included in the central office terminal 900 are in a one-to-one correspondence with N optical modules included in a remote device 904.

An optical module included in the central office terminal 900 shown in this embodiment may be a pluggable optical module, or may be a non-pluggable optical module, which is not specifically limited in this embodiment.

The wavelength control signal is used to indicate a wavelength shift, and the wavelength shift is a shifted wavelength of an actually detected wavelength relative to the target wavelength range.

The wavelength control signal is used to indicate the target wavelength range.

The wavelength detection unit 902 is further configured to receive a pilot tone signal sent by the remote optical module.

The wavelength calculation unit 903 is further configured to determine, based on the pilot tone signal, whether the actually detected wavelength of the remote optical module is within the target wavelength range.

The wavelength calculation unit 903 is specifically configured to: if it is determined that an intensity of a carrier frequency of the pilot tone signal is greater than or equal to a preset value, determine that the actually detected wavelength is within the target wavelength range, or if it is determined that an intensity of a carrier frequency of the pilot tone signal is less than the preset value, determine that the actually detected wavelength is beyond the target wavelength range.

For description for a specific execution procedure of performing the wavelength tuning method shown in FIG. 3 or FIG. 5 by the central office terminal shown in this embodiment and the beneficial effects, refer to the foregoing method embodiment. Details are not described again.

Still with reference to FIG. 4 and FIG. 9, the following provides example description for a specific structure of the remote optical module: The remote device 904 includes N remote optical modules in a one-to-one correspondence with the N optical modules included in the central office terminal 900. For description for a specific structure of the remote optical module included in the remote device 904, refer to FIG. 4. The remote optical module shown in this embodiment further includes a receiving unit 404, where the receiving unit 404 is configured to receive a wavelength control signal, where the wavelength control signal is used to indicate a tuned target wavelength. The control unit 403 is configured to determine a target temperature based on the wavelength control signal, where the target temperature corresponds to the tuned target wavelength. The control unit 403 is further configured to tune a wavelength of a laser of the remote optical module based on the target temperature, where a wavelength of the laser after wavelength tuning is the tuned target wavelength, and the tuned target wavelength is within the target wavelength range.

Optionally, the wavelength control signal is used to indicate a wavelength shift, and the wavelength shift is a shifted wavelength of the actually detected wavelength relative to the target wavelength range.

Optionally, the wavelength control signal is used to indicate the target wavelength range.

Optionally, the control unit 403 is specifically configured to: determine the tuned target wavelength based on the wavelength control signal, obtain a temperature control list, where the temperature control list includes a correspondence between different temperatures and different wavelengths, and determine the target temperature corresponding to the tuned target wavelength based on the temperature control list.

Optionally, the laser 401 is configured to send a pilot tone signal to the central office terminal.

Optionally, the control unit 403 is specifically configured to: determine a reference wavelength, where the reference wavelength is a wavelength that is in wavelengths included in the temperature control list and that has a smallest difference from the tuned target wavelength $\lambda$, determine an adjacent wavelength $\lambda_{i+1}$ included in the temperature control list, where the adjacent wavelength is a wavelength included in the temperature control list and adjacent to the reference wavelength $\lambda_i$, and determine the target temperature T based on a maximum cut-off wavelength $\lambda_{i\_max}$ and a minimum cut-off wavelength $\lambda_{i\_min}$ of a target channel, and the adjacent wavelength $\lambda_{i+1}$.

For a specific execution procedure of performing the wavelength tuning method by the remote optical module shown in this embodiment and description of the beneficial effects, refer to the foregoing method embodiment. Details are not described again.

Figure 10:
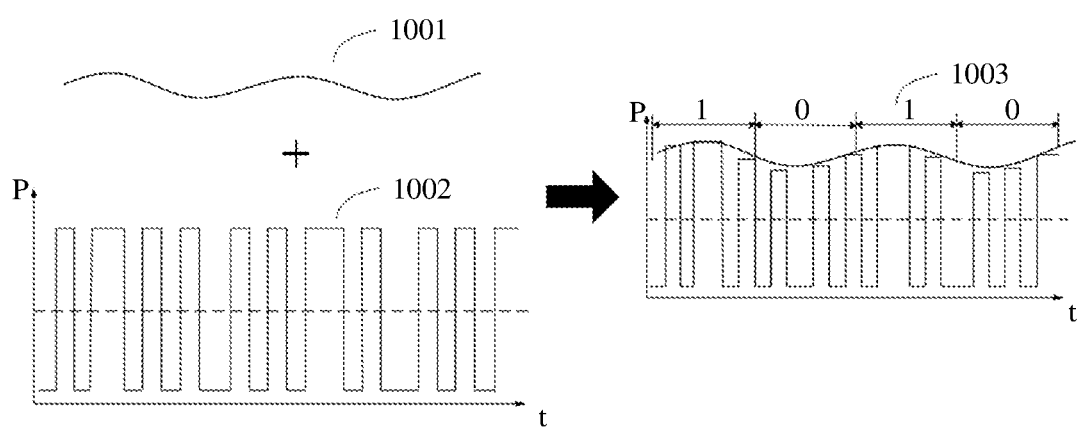
FIG. 10 is a schematic diagram of a pilot tone signal according to an embodiment of the present invention.

In this embodiment of the present invention, the wavelength control signal sent by the central office terminal to the remote optical module may be implemented by using a pilot tone signal, and the tuned target wavelength is indicated by using the pilot tone signal. In addition, the remote optical module may also send the pilot tone signal to the central office terminal, so that the central office terminal performs wavelength monitoring on the remote optical module. A pilot tone signal is also referred to as a pilot tone (pilot tone), a low-frequency perturbation signal, or an over-modulation signal. The pilot tone signal refers to generation of a low-speed optical channel-associated signal in a pilot tone manner, and the low-speed optical associated signal is loaded onto an optical service signal that carries a service, used to monitor the wavelength and transmit optical associated overhead. FIG. 10 is a schematic diagram of a pilot tone signal according to an embodiment of the present invention. Indicating a tuned target wavelength by using a pilot tone signal may be understood as superimposing the pilot tone signal on an optical service signal, and the pilot tone signal may carry information about the tuned target wavelength (such as a wavelength shift or a target wavelength range). Therefore, it is equivalent to loading the information about the tuned target wavelength onto the optical service signal. As shown in FIG. 10, an amplitude signal 1001 in the pilot tone (for example, a sinusoidal signal) that has a low frequency (for example, dozens of MHz or lower) may be superimposed on an optical service signal 1002 that has a high frequency (for example, several GHz or higher) and that is sent by a transmitter of the central office terminal to the remote optical module, to generate a superimposed signal 1003. For example, the information about the tuned target wavelength may be represented by using binary bits "1010" carried in the pilot tone signal. During wavelength monitoring, optical power of the wavelength may be calculated by measuring an amplitude of the pilot tone combined with a modulation depth of the pilot tone. By using a frequency division technology, different pilot tone signals can be loaded onto different wavelengths to monitor a plurality of wavelength channels.

It may be clearly understood by persons skilled in the art that, for the purpose of convenient and brief description, for detailed working processes of the foregoing systems, apparatus, and units, refer to corresponding processes in the foregoing method embodiments. Details are not described herein again.

In the several embodiments provided in this application, it should be understood that the disclosed system, apparatus, and method may be implemented in another manner. The described apparatus embodiment is merely an example. For example, the unit division is merely logical function division, and in actual implementation, there may be another division manner. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in an electrical form or another form.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to a current technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A wavelength tuning method, comprising:
   receiving, by a remote optical module, a wavelength control signal from a central office terminal, wherein the wavelength control signal indicates a target wavelength to be tuned by the remote optical module, and wherein the wavelength control signal is loaded into a first optical service signal in a pilot tone manner;
   determining, by the remote optical module, the target wavelength based on the wavelength control signal;
   obtaining, by the remote optical module, a temperature control list, wherein the temperature control list comprises a correspondence between different temperatures and different wavelengths;
   determining, by the remote optical module, a target temperature corresponding to the target wavelength based on the temperature control list; and
   tuning, by the remote optical module, an operating wavelength of the remote optical module to the target wavelength based on the target temperature;
   wherein determining, by the remote optical module, the target temperature corresponding to the target wavelength based on the temperature control list comprises:
      determining a reference wavelength, wherein the reference wavelength is a wavelength that is in wavelengths comprised in the temperature control list and that has a smallest difference from the target wavelength;
      determining an adjacent wavelength comprised in the temperature control list, wherein the adjacent wavelength is a wavelength comprised in the temperature control list and adjacent to the reference wavelength; and
      determining the target temperature based on a maximum cut-off wavelength and a minimum cut-off wavelength in a target wavelength range, and the adjacent wavelength.

2. The method according to claim 1, wherein the wavelength control signal indicates at least one of a wavelength shift or a target wavelength range, and wherein the wavelength shift is a shifted wavelength of the operating wavelength of the remote optical module relative to the target wavelength range.

3. The method according to claim 1, wherein the wavelength control signal indicates the target temperature.

4. The method according to claim 1, further comprising performing, before the receiving the wavelength control signal:
   sending, by the remote optical module, a detection signal to the central office terminal, wherein the detection signal is loaded into a second optical service signal in the pilot tone manner.

5. A wavelength tuning method, comprising:
   receiving, by a central office terminal, a detection signal sent by a remote optical module, wherein the detection signal is loaded into a second optical service signal in a pilot tone manner;
   determining, by the central office terminal, in response to an intensity of a carrier frequency of the detection signal being greater than or equal to a preset value, that an operating wavelength of the remote optical module is within a target wavelength range;
   determining, by the central office terminal, in response to the intensity of the carrier frequency of the detection signal being less than the preset value, that the operating wavelength of the remote optical module is beyond the target wavelength range; and sending, by a central office terminal, in response to the operating wavelength of the remote optical module being beyond the target wavelength range, a wavelength control signal to the remote optical module, wherein the wavelength control signal indicates a target wavelength to be tuned by the remote optical module, and wherein the wavelength control signal is loaded into a first optical service signal in a pilot tone manner;

wherein the sending the wavelength control signal to the remote optical module causes the remote optical module to:

determine a target temperature corresponding to the target wavelength based on a maximum cut-off wavelength and a minimum cut-off wavelength in a target wavelength range, and further based an adjacent wavelength that is in a temperature control list that comprises a correspondence between different temperatures and different wavelengths and that is adjacent, in the temperature control list, to a reference wavelength of wavelengths of the temperature control list having a smallest difference from the target wavelength; and tune an operating wavelength of the remote optical module to the target wavelength based on the target temperature.

6. The method according to claim 5, wherein the wavelength control signal indicates a wavelength shift, and wherein the wavelength shift is a shifted wavelength of the operating wavelength of the remote optical module relative to the target wavelength range.

7. The method according to claim 5, wherein the wavelength control signal indicates the target wavelength range.

8. An optical module, comprising:

at least one processor and a memory coupled with the one or more processors, wherein the memory comprising instructions, when executed by the at least one processor, cause the optical module to:

receive, through a receiver, a wavelength control signal from a central office terminal, wherein the wavelength control signal indicates a target wavelength to be tuned by the optical module, and wherein the wavelength control signal is loaded into a first optical service signal in a pilot tone manner; determine the target wavelength based on the wavelength control signal;

obtain a temperature control list, wherein the temperature control list comprises a correspondence between different temperatures and different wavelengths;

determine a target temperature corresponding to the target wavelength based on the temperature control list; and tuning, by the optical module, an operating wavelength of the optical module to the target wavelength based on the target temperature;

wherein the instructions that cause the optical module to determine the target temperature corresponding to the target wavelength based on the temperature control list include instructions to cause the optical module to:

determine a reference wavelength, wherein the reference wavelength is a wavelength that is in wavelengths comprised in the temperature control list and that has a smallest difference from the target wavelength;

determine an adjacent wavelength comprised in the temperature control list, wherein the adjacent wavelength is a wavelength comprised in the temperature control list and adjacent to the reference wavelength; and determine the target temperature based on a maximum cut-off wavelength and a minimum cut-off wavelength in the target wavelength range, and the adjacent wavelength.

9. The optical module according to claim 8, wherein the wavelength control signal indicates at least one of a wavelength shift or a target wavelength range, and wherein the wavelength shift is a shifted wavelength of the operating wavelength of the optical module relative to a target wavelength range.

10. The optical module according to claim 8, wherein the wavelength control signal indicates the target temperature.

11. The optical module according to claim 8, wherein the optical module further comprises:

a laser, configured to send a detection signal to the central office terminal, wherein the detection signal is loaded into a second optical service signal in the pilot tone manner.

12. The optical module according to claim 8, wherein the optical module is disposed within a network device.

* * * * *